Re. 24474

March 23, 1954 R. W. AVERY 2,673,337

AMPLIFIER SYSTEM UTILIZING SATURABLE MAGNETIC ELEMENTS

Filed Dec. 4, 1952

INVENTOR
ROBERT W. AVERY
BY
Laurence R. Brown
ATTORNEY

Patented Mar. 23, 1954

2,673,337

UNITED STATES PATENT OFFICE 2,673,337

AMPLIFIER SYSTEM UTILIZING SATURABLE MAGNETIC ELEMENTS

Robert William Avery, Clifton Heights, Pa., assignor to Burroughs Adding Machine Company, a corporation of Michigan Application December 4, 1952, Serial No. 324,117

11 Claims. (Cl. 340—174)

This invention relates to electronic amplifier circuits and more particularly it relates to circuits for power amplification utilizing saturable magnetic elements.

Prior art use of saturable magnetic circuit elements for statically storing binary information is described in articles such as that entitled "Magnetic triggers" published in the June 1950 issue of the Proceedings of the I. R. E. by An Wang. Binary electrical signals are converted to a saturating flux source and retained in the static elements by magnetic cores of a material having high remanence characteristics. Output signals are derived from the cores by establishing a read-out flux condition therein of a polarity tending to establish a given permanent magnetic condition. When the core is in the same magnetic remanence condition as that tended to be established by the read-out flux very little change of flux is presented and little output voltage is induced in windings on the core. Conversely, however when the state of flux is reversed, a high change of flux is presented and accordingly a large output potential is induced in windings about the core.

Such static magnetic elements have been used in shift registers of computer type circuits for storing binary signal information. By connecting a plurality of elements in a shift register, binary information having both a word and digit length of several bits may be readily stored for either long or short periods of time. Other circuitry has been evolved which makes such elements useful in performing different types of logical functions.

These static magnetic elements generally take the form of a small toroidal transformer about the size of a wedding ring. Thus, the size and the ruggedness of these elements coupled with the various fields of use to which they are adapted make them desirable for exclusive use in electronic equipment. Also there is no stand-by power required for maintaining the permanent magnetic storage in these elements, and for this reason they are termed "static" magnetic elements. Because of the aforedescribed physical characteristics such devices are highly desirable in replacing electronic tubes.

Output signals in magnetic elements, such as those described, having saturable characteristics are derived from an output winding excited by a read-out or shift signal source until the time the cores are driven into saturation by the read-out signals. Because of the saturation characteristics of static magnetic elements at a low flux density, as desirable to afford a change in the remanence condition with a small signal potential, the output power of the devices is limited. Although devices such as electronic tubes may be used in some instances to afford power amplification, it is desirable to provide power amplification with the static magnetic elements. In this manner not only can a complete system be provided with a few basic standard elements, but impedance matching between the static magnetic elements is more easily accomplished than when a transition is required between these elements and other types of power amplifier circuits.

In many cases the combined functions of storage of a signal and the derivation of large amounts of power from the stored signals during read-out are desirable. It may also be desirable in such cases to provide successive read-out signals from a storage register with a single read-in signal. The information in a storage register therefore should provide multiple read-out without destroying stored information and in addition afford a large amount of power output.

It is therefore a general object of the invention to provide improved circuits utilizing magnetic circuit elements.

It is a more specific object of the invention to provide a circuit in which power amplification may be accomplished by exclusively utilizing saturable magnetic elements.

It is another object of the invention to provide electronic systems utilizing a minimum number of standardized circuit elements.

A further object of the invention is to provide magnetic shift register systems capable of providing both a plurality of successive read-out operations without destroying stored information and power amplification.

Circuits constructed in accordance with the invention for providing power amplification may in general comprise a plurality of static magnetic elements connected in several cascaded tiers of a pyramid circuit arrangement. In this manner information is shifted from one tier to another and thereby becomes available at an advanced tier in a plurality of elements, which may either be connected in parallel or to a plurality of circuits to afford high output power requirements from an initial low power output signal source. In order to permit successive read-out operations from the power amplifier storage register with a single read-in operation, means is provided for clearing all the elements to an initial condition except those in a basic pyramid tier, together with means for resetting those elements in the basic tier to their initial stored condition by a feed back loop from an advanced positioned tier to the basic tier before a successive read-out operation need be initiated. Both power amplification and storage is therefore provided in a magnetic shift register by a regeneration process of reading of binary information from a small number of elements into a large number of elements.

Other features and objects of the invention will be found throughout the more detailed description of the invention which follows. Those novel features believed descriptive of the nature of the invention are described with particularity in the appended claims. To more clearly portray the invention and its manner of operation the description is supplemented with the accompanying drawings, in which:

Figures 1, 2, 3:
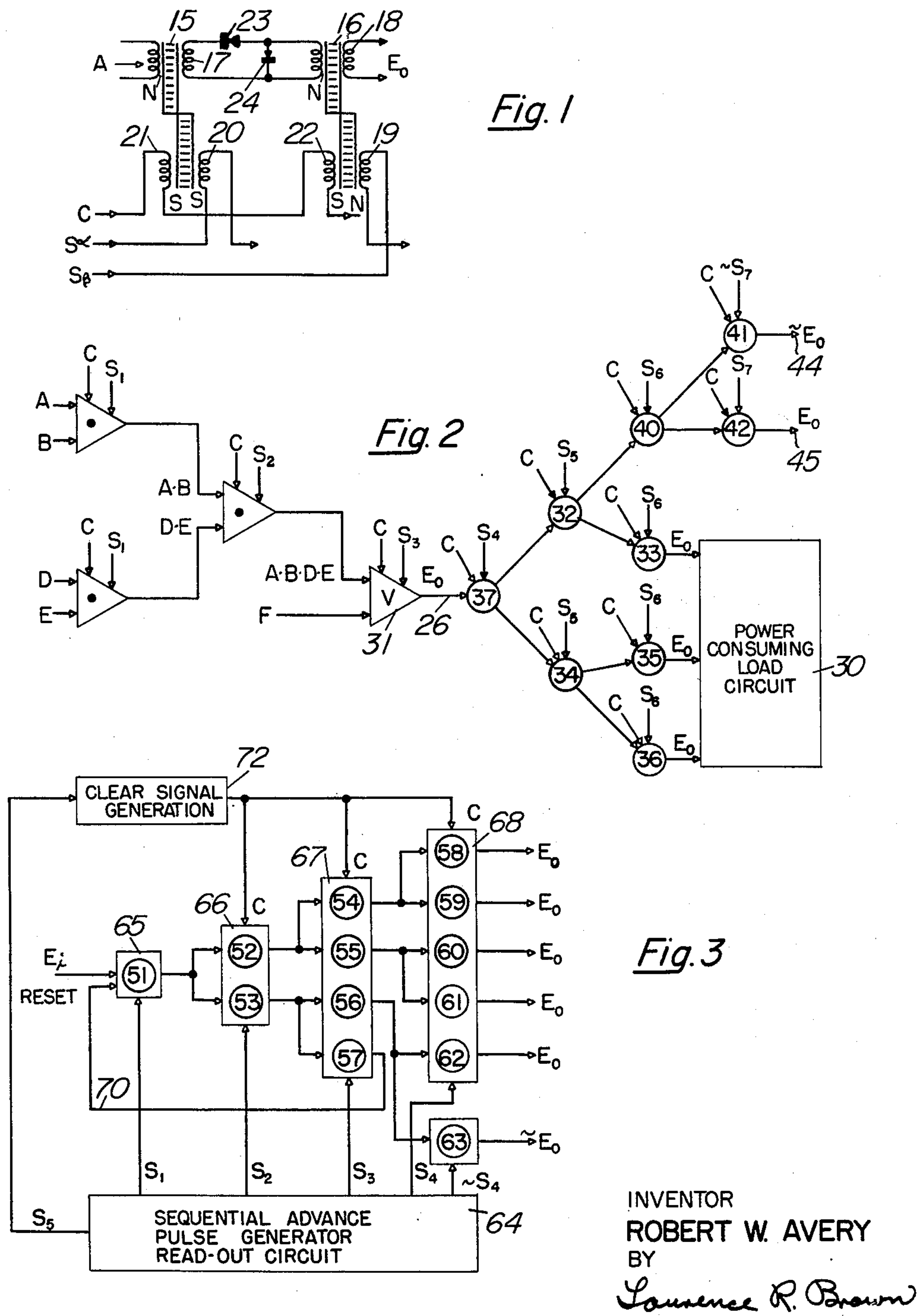
Fig. 1 is a schematic representation of static magnetic circuit elements utilized in accordance with the invention.
Fig. 2 is a block diagram of a logical operation circuit embodying the invention.
Fig. 3 is a block diagram of magnetic shift register system constructed in accordance with the invention.

Referring now in particular to Fig. 1, the core elements 15 and 16 are drawn to designate a static magnetic material such as the well known commercial materials "Deltamax" and "Molypermalloy" having high magnetic remanence characteristics when excited by a saturating flux source. Different windings are provided about the cores. The shift or advancing windings 19 and 20 are connected in this embodiment to provide a magnetic shift register or delay line for storing binary information in the respective cores 15 and 16. Thus, the presence of an input signal A will tend to establish a magnetic remanence condition N in the core 15 to store one binary condition and the absence of the signal will tend to maintain the S remanence to indicate a second binary condition. When a first read-out or shift signal $S_\alpha$ is applied to core 15 which tends to establish a remanence condition S, it induces a high potential in the output winding 17 if the N is stored in core 15. In this case the output winding 17 accordingly tends to establish a remanence condition N in the succeeding core 16. In the same manner a second shift signal $S_\beta$ in time relationship will transfer the same or other information from core 16 to a further static magnetic circuit, or other utilization means connected to the output winding 18.

It is noted with respect to the element 16 that the shift signal $S_\beta$ tends to establish a remanence condition of N rather than S thereby providing an output potential only if the input signal A is not present. In logical terminology this represents the negative of a condition or a logical "not" ($\sim$) function. This is accomplished by merely changing the direction of the flux established by the read-out winding 19, and is useful in performing different logical operations, as more fully described in the copending Avery application for Logical Circuits, Serial No. 324,118, filed December 4, 1952, and assigned to the same assignee as this invention.

It should be noted that an output voltage will be generated at 18 when a voltage is produced at 17. This effect may be inhibited by clear pulses in winding 22 of opposite polarity if objectionable.

A reset or clear signal C is connected serially to each of the reset windings 21 and 22 on the respective core elements 15 and 16. A clear signal therefore tends to establish an initial remanence condition S in each core so that an input signal of N polarity is required to establish the opposite remanence condition. Accordingly, the device acts as a binary bit storage element and stores information until a suitable external signal $S_\alpha$ or $S_\beta$ is applied to shift the stored information out of a desired output winding. It is noted that an output signal is established whenever the remanence condition is changed from one polarity to another and therefore rectifiers 23 and 24 may be inserted in the coupling circuit between elements to block signals of one or the other polarity if they are objectionable.

The aforedescribed static magnetic circuit elements are designated in the remaining figures in block diagram form to more readily indicate the nature of the invention, and simplify the explanation thereof. Thus, the block diagram circuit of Fig. 2 represents electronic means for providing a logical operation of the type used in electronic computer circuits, or the like. Conjunctive type circuits are designated by the logical "and" symbols ($\cdot$) and the alternative type circuits are designated by the logical "or" symbol ($^{\vee}$). These circuits operate upon input signals to provide an output signal respectively when the input signals arrive in conjunction or in the alternative. In the described circuit therefore, at the output lead 26 the signal $E_0$ is present "if and only if" ($\rightleftarrows$) either the input signals A, B, D and E are all present in conjunction, or the signal F is present. Information is progressively passed along the banks or tiers by the sequentially presented advance signals $S_1$, $S_2$, etc. in the manner described above. Clear signals are also provided in the manner described to each element to initially set it in one static condition for starting the logical operation in a desired manner.

Assume that the load circuit 30 is provided which requires a larger amount of input power than available from the magnetic "or" element 31, from which the output signal $E_0$ is derived at lead 26. In accordance with the invention, therefore, the magnetic elements 32—37 and 40—42 are connected in several tiers of a pyramid circuit arrangement. In this manner information is shifted or regenerated into a larger number of elements, preferably having their input windings connected in series, and the elements may therefore be used to afford the additional power required by the load circuit 30.

The pyramiding of magnetic elements may be utilized for other operational functions than power amplification as indicated by the magnetic elements 40—42. In this respect it may be assumed that a low power signal is required simultaneously at two output leads 44 and 45 having different logical characteristics. Thus, in the element 41, by reversing the polarity of the shift signal to provide $\sim S_7$, the desired output condition $\sim E_0$ is provided at terminal 44, whereas the condition $E_0$ is simultaneously afforded at the terminal 45 by the element 42. It accordingly follows that the magnetic shift register circuits may be utilized for storage and logical operations as well as power amplification. Other circuit aspects of this nature for providing more efficient operation are described in the copending I. L. Auerbach and R. W. Avery application for "Logical Computer Circuits," Serial No. 324,116, filed December 4, 1952.

Considering now the magnetic shift register system shown in Fig. 3, the combined operations of storage and power amplification hereinbefore described may be utilized to provide from a single input signal $E_i$ a plurality of output signals $E_o$ and $\sim E_o$ which afford much greater available power output than at the single input element 51. In this system the separate elements 51 through 63 are connected in a pyramided array to provide the combined storage and power amplification functions. Information is regenerated by means of sequentially presented advancing pulses from generator 64 from one input element 51 into a plurality of output elements 58 through 63 through different register banks or pyramid tiers 65—68 to provide power amplification. Thus, by coupling several elements into cascaded pyramid tiers 65—68, reading information into a basic or minor pyramid tier 65, advancing the read-in information from tier to tier, and reading the information out of an advanced or major tier of the pyramid in accordance with the invention, there is provided an improved method of performing power amplification solely with saturable magnetic elements so that a complete system may be provided utilizing static magnetic elements to the exclusion of electronic amplifier tubes.

In a magnetic shift register it is frequently desired to read information out several times before a succeeding read-in signal is applied. Referring again to Fig. 1, note that the read-out signal applied to the read-out winding 20 when reading-out the stored signal of element 15, which has established a polarity N, establishes the opposite polarity S in the core 15. Thus, the information in the core is destroyed by the read-out cycle, when done in a conventional manner. Accordingly, means is provided in the shown embodiment of the invention for restoring or resetting the first bank 65 of the register to its initial condition without re-writing information into the register from an external circuit.

A regeneration loop 70 is therefore provided in the magnetic shift register system for restoring information from an advanced position bank 67 to the preceding bank 65 to reset it with the same binary information which it held before read-out. It is noted that the clear signal from generator 72 is not applied to the bank 65 during the read-out cycle. The clear signal generator is actuated in sequence with the read-out advancing pulses, however, to clear all the other banks including elements 52 through 63 after read-out to thereby establish the condition necessary for a further read-out cycle without re-writing information in by means of the externally produced input signal $E_i$.

The method of obtaining both power amplification and successive read-out operations without destroying information stored in the static magnetic elements therefore is perfomed by clearing information from all pyramid tiers except a basic tier, and shifting information similar to the originally stored information back into the element by means of a regeneration loop.

It is clear from the foregoing description of the invention and its manner of operation that there is afforded a novel amplifier and storage system by means of which saturable magnetic elements may be used exclusively as circuit elements. It is to be recognized that different numbers of windings may be provided on the elements and other modifications may be made without departing from the invention. Those embodiments shown herein are chosen for the purpose of clearly illustrating the principles of the present invention. Certain features believed indicative of the nature and scope of the invention are defined with particularity in the appended claims.

What is claimed is:

1. A power amplifier system for binary electronic signals comprising in combination, a plurality of static magnetic elements for magnetically storing binary signals each having read-in, output, and read-out circuits; an electrical circuit connecting said elements in a pyramided arrangement; and a shift circuit connected to said read-out circuits for transferring said signals from one tier of said pyramided arrangement to the next thereby affording greater available power output at a larger number of elements in an advanced position tier of said pyramided arrangement.

2. A system as defined in claim 1 adapted for a plurality of read-out operations without destroying the stored information including a first tier in said pyramided arrangement, storage clearing means connected to all tiers except said first tier, and means connected to at least one successive tier for restoring information to said first tier after the read-out operation whereby a successive clear and read-out signal in the order named will clear the system to the originally stored stage and establish a read-out sequence identical to that afforded upon the initial read-out actuation.

3. A system as defined in claim 1 in which modification of the stored information is effected in accordance with predetermined logical requirements in at least one of the tiers in said pyramided arrangement.

4. A regeneration cycle method of obtaining both power amplification and successive read-out operations without destroying stored information in a series of static magnetic storage elements connected in several cascaded tiers of a pyramid arrangement including the steps of, reading information into a basic pyramid tier, clearing information from all pyramid tiers except said basic tier and shifting the information stored in the basic tier in a regeneration cycle from tier to tier in progression whereby greater output power is available for driving a plurality of stages at the advanced tiers of the pyramid.

5. A method as defined in claim 4 including the step of regeneratively restoring information to said basic tier during the shifting operation.

6. A multi-bank magnetic shift register system having advancing means for successively reading information out of the several banks, and a regeneration loop for restoring information from at least one advanced position bank to a preceding bank whereby repeated read-out cycles may be made without re-writing information into the storage register from an external circuit.

7. The method of providing power amplification with magnetic elements coupled into several cascaded tiers of a pyramid arrangement comprising the steps of reading information into a basic tier having a small number of elements, advancing the read-in information from tier to tier, and reading the information out of an advanced tier of the pyramid having a larger number of elements.

8. A power amplifier circuit comprising, a plurality of magnetic elements connected into several cascaded tiers of a pyramid arrangement, means connected to a basic tier having a small number of elements for reading-in information, means for advancing the information from tier to tier, and means for reading-out the information at an advanced tier having a larger number of elements.

9. A power amplifier circuit comprising, a magnetic shift register having a plurality of static magnetic elements connected into several cascaded tiers of a pyramid, read-in means connected to a tier having a small number of elements connected therein, means advancing information from tier to tier, read-out means connected to a tier having a large number of elements connected therein, a circuit coupled to the last mentioned tier requiring more power input than available at the first mentioned tier, and regeneration means connected from an advanced position tier back to the read-in tier for restoring information read-out of the tier by said advancing means.

10. A power amplifier system comprising in combination, a plurality of saturable magnetic elements, a circuit connecting said elements into tiers of a pyramid, means reading information into a tier having a small number of elements and means reading information out of a tier having a large number of elements.

11. A system of magnetic elements having a plurality of said elements connected in the tiers of a pyramid circuit, means establishing an input signal at a minor tier and means advancing the signal from tier to tier.

ROBERT WILLIAM AVERY.

References Cited in the file of this patent

UNITED STATES PATENTS

| Number | Name | Date |
|---|---|---|
| 2,557,086 | Fisk et al. | June 19, 1951 |
| 2,649,502 | Odell | Aug. 18, 1953 |